US012771451B2

(12) United States Patent
Abe

(10) Patent No.: US 12,771,451 B2
(45) Date of Patent: Oct. 20, 2026

(54) LIGHT MULTIPLEXING/DEMULTIPLEXING DEVICE AND LIGHT MULTIPLEXING/DEMULTIPLEXING METHOD

(71) Applicant: NEC Corporation, Tokyo (JP)

(72) Inventor: Ryota Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 261 days.

(21) Appl. No.: 18/683,328

(22) PCT Filed: Aug. 27, 2021

(86) PCT No.: PCT/JP2021/031476
§ 371 (c)(1),
(2) Date: Feb. 13, 2024

(87) PCT Pub. No.: WO2023/026463
PCT Pub. Date: Mar. 2, 2023

(65) Prior Publication Data
US 2024/0348338 A1 Oct. 17, 2024

(51) Int. Cl.
*H04J 14/02* (2006.01)
*H04B 10/293* (2013.01)

(52) U.S. Cl.
CPC ........ *H04B 10/293* (2013.01); *H04J 14/0212* (2013.01); *H04J 14/0307* (2023.08)

(58) Field of Classification Search
CPC ................ H04J 14/0205–0212; H04J 14/0213
See application file for complete search history.

(56) References Cited

U.S. PATENT DOCUMENTS

2005/0019034 A1* 1/2005 Aoki ..................... H04J 14/022 398/59
2016/0149663 A1* 5/2016 Ji ........................ H04J 14/0212 398/48

(Continued)

FOREIGN PATENT DOCUMENTS

JP 2001-102666 A 4/2001
JP 2001-111496 4/2001

(Continued)

OTHER PUBLICATIONS

International Search Report for PCT Application No. PCT/JP2021/031476, mailed on Nov. 9, 2021.

(Continued)

*Primary Examiner* — Nathan M Cors
(74) *Attorney, Agent, or Firm* — Sughrue Mion, PLLC

(57) ABSTRACT

The light multiplexing/demultiplexing device comprises: a first demultiplexer that demultiplexes an inputted first wavelength-multiplexed signal light into a first signal light of a first wavelength band and a second signal light of a second wavelength band and outputs the first and the second signal light; a first amplifier that amplifies the second signal light from the first demultiplexer; a light processor that, based on the inputted second signal light and an inputted third signal light of the second wavelength band, outputs a fourth signal light; and a first multiplexer that multiplexes the fourth signal light with the first signal light from the first demultiplexer, further, the gain of the first amplifier is set such that the difference between power of the first signal light outputted from the first multiplexer and power of the fourth signal light outputted from the first multiplexer is equal to or less than a predetermined value.

9 Claims, 8 Drawing Sheets

(56) References Cited

U.S. PATENT DOCUMENTS

| | | | | |
|---|---|---|---|---|
| 2020/0067622 A1* | 2/2020 | Nakano | ............... | H01S 3/06766 |
| 2020/0244356 A1* | 7/2020 | Asada | ................ | H04B 10/0797 |
| 2023/0275667 A1* | 8/2023 | Kawahara | .......... | H04Q 11/0005 398/50 |

FOREIGN PATENT DOCUMENTS

| | | |
|---|---|---|
| JP | 2010-050363 A | 3/2010 |
| JP | 2012-182725 | 9/2012 |
| WO | 2018/123921 | 7/2018 |
| WO | 2019/188462 | 10/2019 |

OTHER PUBLICATIONS

English translation of Written opinion for PCT Application No. PCT/JP2021/031476, mailed on Nov. 9, 2021.

* cited by examiner

LIGHT MULTIPLEXING/DEMULTIPLEXING DEVICE AND LIGHT MULTIPLEXING/DEMULTIPLEXING METHOD

This application is a National Stage Entry of PCT/JP2021/031476 filed on Aug. 27, 2021, the contents of all of which are incorporated herein by reference, in their entirety.

TECHNICAL FIELD

The present invention relates to a light multiplexing/demultiplexing device and a light multiplexing/demultiplexing method, more particularly, to a light multiplexing/demultiplexing device and a light multiplexing/demultiplexing method that have a function of adjusting optical power of multiplexed wavelength-multiplexed signal light.

BACKGROUND ART

In an optical transmission system including devices (submarine devices) such as an optical branching device and a light multiplexing/demultiplexing device being installed on the sea bottom, wavelength-multiplexed signal light in a broadband of from a C-band to an L-band is transmitted. For long-distance transmission of such broadband wavelength-multiplexed signal light, an optical amplifier capable of amplifying wavelength-multiplexed signal light in both C-band and L-band wavelength bands is required. In the present description, the C-band refers to a wavelength band of a wavelength equal to or more than 1530 nm and less than 1565 nm, and the L-band refers to a wavelength band of a wavelength equal to or more than 1565 nm and less than 1625 nm. In addition, hereinafter, wavelength-multiplexed signal light is referred to as "WDM signal light". WDM is an abbreviation for Wavelength Division Multiplexed. Further, WDM signal light having the C-band as the wavelength band is referred to as "C-band WDM signal light", and WDM signal light having the L-band as the wavelength band is referred to as "L-band WDM signal light". One example of the optical transmission system described above is disclosed in PLT 1.

FIG. 8 is a block diagram illustrating a configuration of a general optical amplifier 900 described in PLT 1. FIG. 8 also illustrates a spectrum of WDM signal light in each unit, where the vertical axis (height) represents optical power and the horizontal axis represents wavelength. The WDM signal light being input to the optical amplifier 900 is demultiplexed into C-band WDM signal light and L-band WDM signal light by a demultiplexer 901. The demultiplexed C-band WDM signal light and L-band WDM signal light are respectively amplified by a C-band EDFA 902 and an L-band EDFA 903. Such amplified WDM signal light is wavelength-multiplexed by a multiplexer 904, and output from the optical amplifier 900. Note that EDFA means an erbium-doped optical fiber amplifier.

CITATION LIST

Patent Literature

PTL 1: Japanese Unexamined Patent Application Publication No. 2010-050363

SUMMARY OF INVENTION

Technical Problem

In a general optical submarine transmission system that transmits WDM signal light including C-band and L-band signal light, it is necessary to mount both the C-band EDFA 902 and the L-band EDFA 903 in a submarine device in order to compensate for attenuation of the WDM signal light. Further, in order to excite such optical amplifiers, two exciting light sources are required, and for each thereof, two multiplexers that multiplex excited light and WDM signal light are also required. As a result, in a case of transmitting WDM signal light including C-band and L-band signal light, the number of optical components constituting an optical amplifier is doubled compared to, for example, a case of transmitting only C-band WDM signal light.

Meanwhile, a housing space for components inside a submarine device is limited, and recently, there is also an increasing number of cases in which a component with a plurality of optical fibers connected thereto (for example, a wavelength selective switch (WSS) and the like) is mounted in a submarine device. Therefore, the housing space for components of an optical amplifier may be further limited. In addition, when a passive component such as a WSS is disposed, for example, only on a path of the C-band WDM signal light in order to reduce the number of optical components to be housed in a submarine device, a large difference in loss in the submarine device is generated between the C-band WDM signal light and the L-band WDM signal light. As a result, a difference in optical power is generated between the C-band WDM signal light and L-band WDM signal light being output from the submarine device. Such an optical power difference between wavelength bands may affect transmission quality.

OBJECT OF INVENTION

An object of the present invention is to provide a technique for suppressing, by using a simple structure, occurrence of an optical power difference between wavelength bands in a light multiplexing/demultiplexing device for use in an optical submarine transmission system.

Solution to Problem

A light multiplexing/demultiplexing device according to the present invention includes: a first demultiplexing means for demultiplexing input first wavelength-multiplexed signal light into first signal light of a first wavelength band and second signal light of a second wavelength band, and outputting each of the first signal light and the second signal light; a first amplifying means for amplifying the second signal light being input from the first demultiplexing means; a light processing means for outputting fourth signal light, based on the input second signal light and input third signal light of the second wavelength band; and a first multiplexing means for multiplexing the first signal light being output from the first demultiplexing means and the fourth signal light, wherein a gain of the first amplifying means is set in such a way that a difference between optical power of the first signal light being output from the first multiplexing means and optical power of the fourth signal light being output from the first multiplexing means is equal to or less than a predetermined value.

A light multiplexing/demultiplexing method according to the present invention includes procedures of: demultiplexing, by a demultiplexing means, input first wavelength-multiplexed signal light into first signal light of a first wavelength band and second signal light of a second wavelength band; amplifying the second signal light; outputting fourth signal light, based on the amplified second signal light and input third signal light of the second wavelength band; and multiplexing, by a multiplexing means, the fourth signal light and the first signal light being output from the demultiplexing means, wherein a gain of amplification of the second signal light is set in such a way that a difference between optical power of the first signal light being output from the multiplexing means and optical power of the fourth signal light being output from the multiplexing means is equal to or less than a predetermined value.

Advantageous Effects of Invention

The present invention enables suppressing occurrence of an optical power difference between wavelength bands in a light multiplexing/demultiplexing device, by using a simple structure.

EXAMPLE EMBODIMENT

Figure 1:
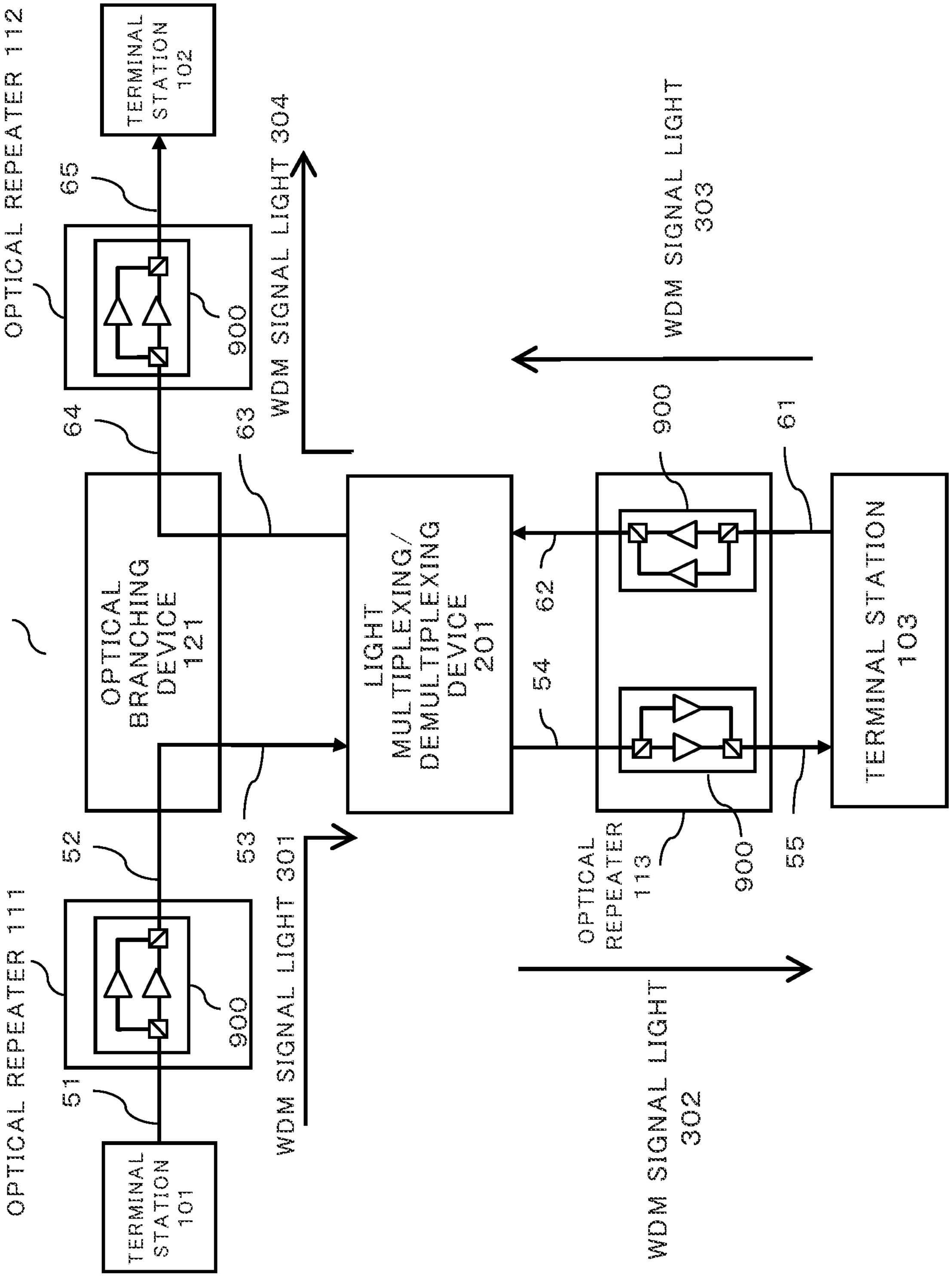
FIG. 1 is a block diagram illustrating a configuration example of a submarine transmission system 1.

Example embodiments of the present invention are described below with reference to the drawings. The directions of arrows illustrated in the drawings are merely examples, and are not intended to limit the direction of signal light. Aforementioned elements are denoted with the same reference signs in each of the example embodiments and the drawings, and overlapping description thereof is omitted.

First Example Embodiment

FIG. 1 is a block diagram illustrating a configuration example of a submarine transmission system 1 according to a first example embodiment of the present invention. The submarine transmission system 1 includes terminal stations 101 to 103, optical repeaters 111 to 113, an optical branching device 121, and a light multiplexing/demultiplexing device 201. The terminal stations 101 to 103 are installed on land, and have an interface function between a land transmission system (not illustrated) and the submarine transmission system 1. The optical repeaters 111 to 113, the optical branching device 121, and the light multiplexing/demultiplexing device 201 are installed on the seabed. Submarine cables 51 to 55 and 61 to 65 are submarine cables including optical fiber transmission paths, for connecting such devices.

The terminal station 101 includes an optical transmitter, and transmits WDM signal light 301 being wavelength-multiplexed signal light of C-band WDM signal light and L-band WDM signal light to the optical repeater 111. The terminal station 102 includes an optical receiver, and receives WDM signal light 304 from the optical repeater 112. The terminal station 103 includes an optical transmitter and an optical receiver, and receives WDM signal light 302 from the optical repeater 113 and transmits WDM signal light 303 being wavelength-multiplexed signal light of C-band WDM signal light and L-band signal light to the optical repeater 113.

The optical branching device 121 controls connections between the submarine cables 52, 53, 63, and 64. According to the present example embodiment, the optical branching device 121 connects the submarine cable 52 and the submarine cable 53 and connects the submarine cable 63 and the submarine cable 64. Through such connections, the WDM signal light 301 transmitted from the terminal station 101 is transmitted to the light multiplexing/demultiplexing device 201 via the optical repeater 111. Further, the WDM signal light 304 transmitted from the light multiplexing/demultiplexing device 201 is transmitted to the terminal station 102 via the optical repeater 112. The function of the optical branching device 121 may be achieved by an optical switch included in the optical branching device 121. The optical switch may be controlled by a control signal being transmitted from any of the terminal stations 101 to 103 to the light multiplexing/demultiplexing device 201.

The optical repeaters 111 and 112 each include a set of optical amplifiers for amplifying C-band and L-band WDM signal light. The optical repeaters 111 and 112 according to the present example embodiment may include the general optical amplifier 900 as described with reference to FIG. 8, in order to amplify C-band and L-band signal light. For example, the optical repeater 111 amplifies the WDM signal light 301 received from the terminal station 101, by using a C-band EDFA and an L-band EDFA. The optical repeater 112 amplifies the WDM signal light 304 received from the optical branching device 121, by using a C-band EDFA and an L-band EDFA.

Figure 8:
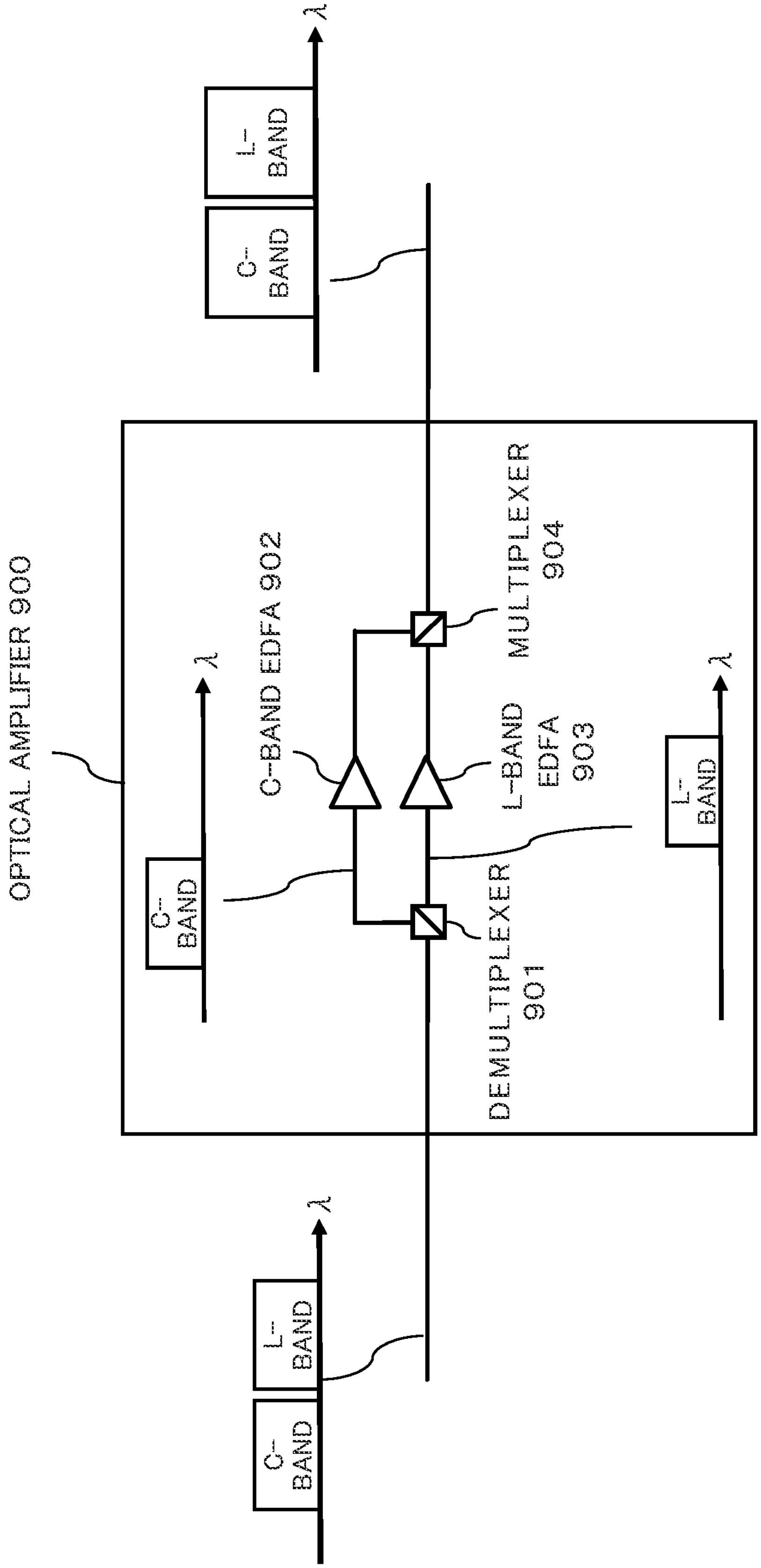
FIG. 8 is a block diagram illustrating a configuration of a general optical amplifier 900.

The optical repeater 113 may include two sets of the optical amplifiers 900 as described with reference to FIG. 8. The optical repeater 113 amplifies the WDM signal light 302 received from the light multiplexing/demultiplexing device 201, and transmits the amplified WDM signal light 302 to the terminal station 103. Further, the optical repeater 113 amplifies the WDM signal light 303 received from the terminal station 103, and transmits the amplified WDM signal light 303 to the light multiplexing/demultiplexing device 201.

The light multiplexing/demultiplexing device 201 receives the WDM signal light 301 from the optical branching device 121, and receives the WDM signal light 303 from the optical repeater 113. The light multiplexing/demultiplexing device 201 processes the WDM signal light 301 and 303, and generates the WDM signal light 302 and 304, based on the WDM signal light 301 and 303. Then, the light multiplexing/demultiplexing device 201 transmits the WDM signal light 302 to the optical repeater 113, and transmits the WDM signal light 304 to the optical branching device 121.

Details of the light multiplexing/demultiplexing device 201 will be described with reference to FIG. 2.

Figure 2:
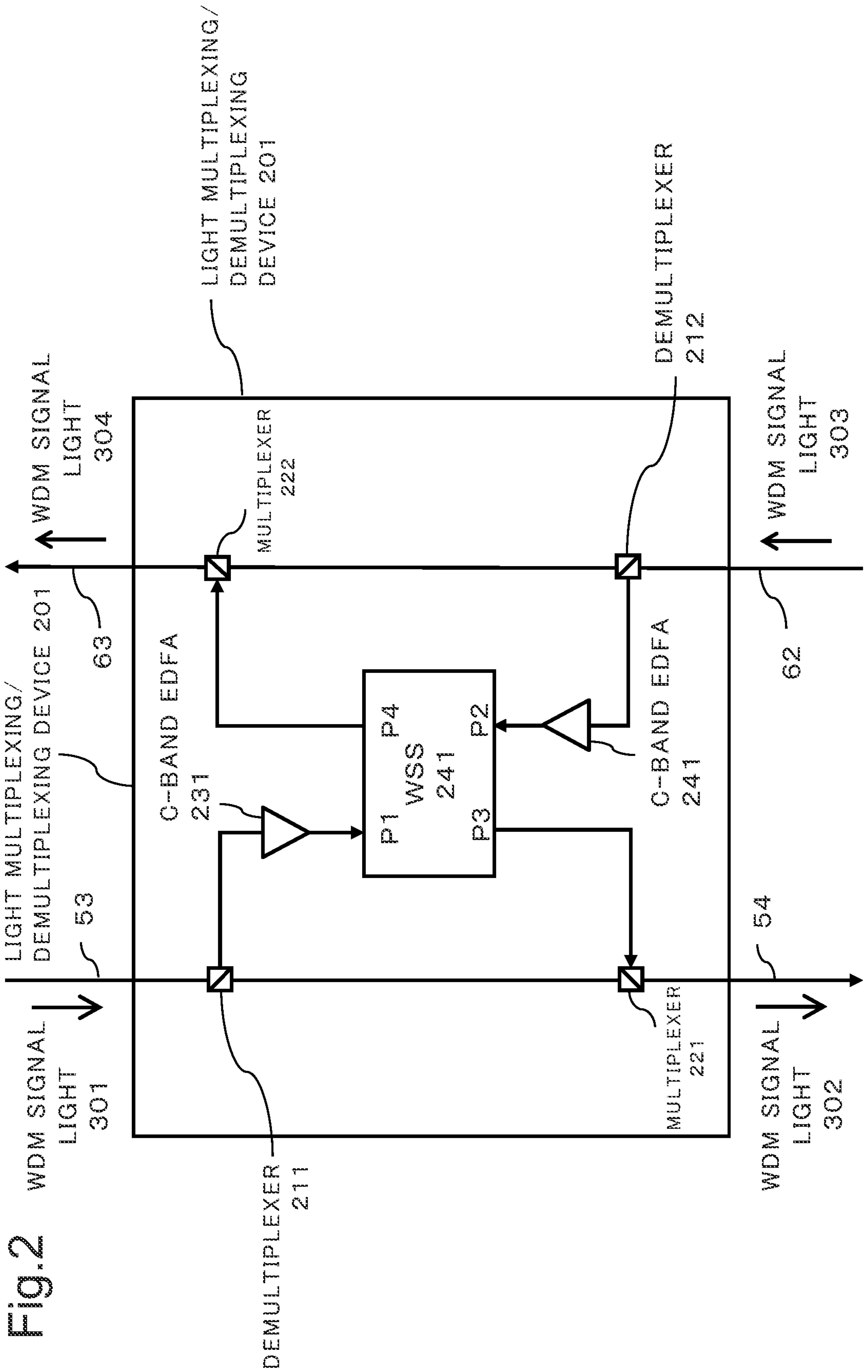
FIG. 2 is a block diagram illustrating a configuration example of a light multiplexing/demultiplexing device 201.

FIG. 2 is a block diagram illustrating a configuration example of the light multiplexing/demultiplexing device 201. The light multiplexing/demultiplexing device 201 includes demultiplexers 211 and 212, multiplexers 221 and 222, C-band EDFAs 231 and 232, and a WSS 241.

The demultiplexer 211 divides the WDM signal light 301 received from the optical branching device 121 via the submarine cable 53 into C-band WDM signal light and L-band WDM signal light. The demultiplexer 212 divides the WDM signal light 303 received from the terminal station 103 via the submarine cable 62 into C-band WDM signal light and L-band WDM signal light.

The C-band EDFA 231 amplifies the C-band WDM signal light divided in the demultiplexer 211. The C-band EDFA 232 amplifies the C-band WDM signal light divided in the demultiplexer 212.

The WSS 241 is a wavelength selective switch including two input ports P1 and P2 and two output ports P3 and P4. The WSS 241 is a device capable of outputting, through P3 and P4, C-band WDM signal light including a signal light of a predetermined wavelength, from among C-band WDM signal light being input through P1 and P2. The WSS 241 has a function of setting, from the outside of the WSS 241, a relationship between the wavelengths of signal light being input through P1 and P2 and the wavelengths of signal light being output through P3 and P4. Such a function of the WSS 241 is a known function. The light multiplexing/demultiplexing device 201 may include a control circuit for controlling the WSS 241. The control circuit may control the WSS 241, based on a command from any of the terminal stations 101 to 103.

The C-band WDM signal light amplified in the C-band EDFA 231 is input to the WSS 241 through P1. The C-band WDM signal light amplified in the C-band EDFA 232 is input to the WSS 241 through P2. The WSS 241 generates, based on such C-band WDM signal light, C-band WDM signal light to be transmitted to the terminal station 102 and C-band WDM signal light to be transmitted to the terminal station 103. The C-band WDM signal light to be transmitted to the terminal station 102, generated by the WSS 241, is multiplexed, by the multiplexer 222, with the L-band WDM signal light being input from the demultiplexer 212. The WDM signal light multiplexed by the multiplexer 222 is transmitted as the WDM signal light 304 to the optical branching device 121. Meanwhile, the C-band WDM signal light to be transmitted to the terminal station 103, generated by the WSS 241, is multiplexed, by the multiplexer 221, with the L-band WDM signal light being input from the demultiplexer 211. The WDM signal light multiplexed by the multiplexer 221 is transmitted to the optical repeater 113 as the WDM signal light 302.

In the light multiplexing/demultiplexing device 201, the L-band WDM signal light included in the WDM signal light 301 transmitted from the terminal station 101 is transmitted to the terminal station 103 via the demultiplexer 211 and the multiplexer 221. The L-band WDM signal light included in the WDM signal light 303 transmitted from the terminal station 103 is transmitted to the terminal station 102 via the demultiplexer 212 and the multiplexer 222.

In addition, the C-band WDM signal light included in the WDM signal light 301 transmitted from the terminal station 101 is processed in the WSS 241 being included in the light multiplexing/demultiplexing device 201, and transmitted to the terminal station 102 and/or the terminal station 103. The C-band WDM signal light included in the WDM signal light 303 transmitted from the terminal station 103 is processed in the WSS 241 being included in the light multiplexing/demultiplexing device 201, and transmitted to the terminal station 102 and/or the terminal station 103.

Figure 3:
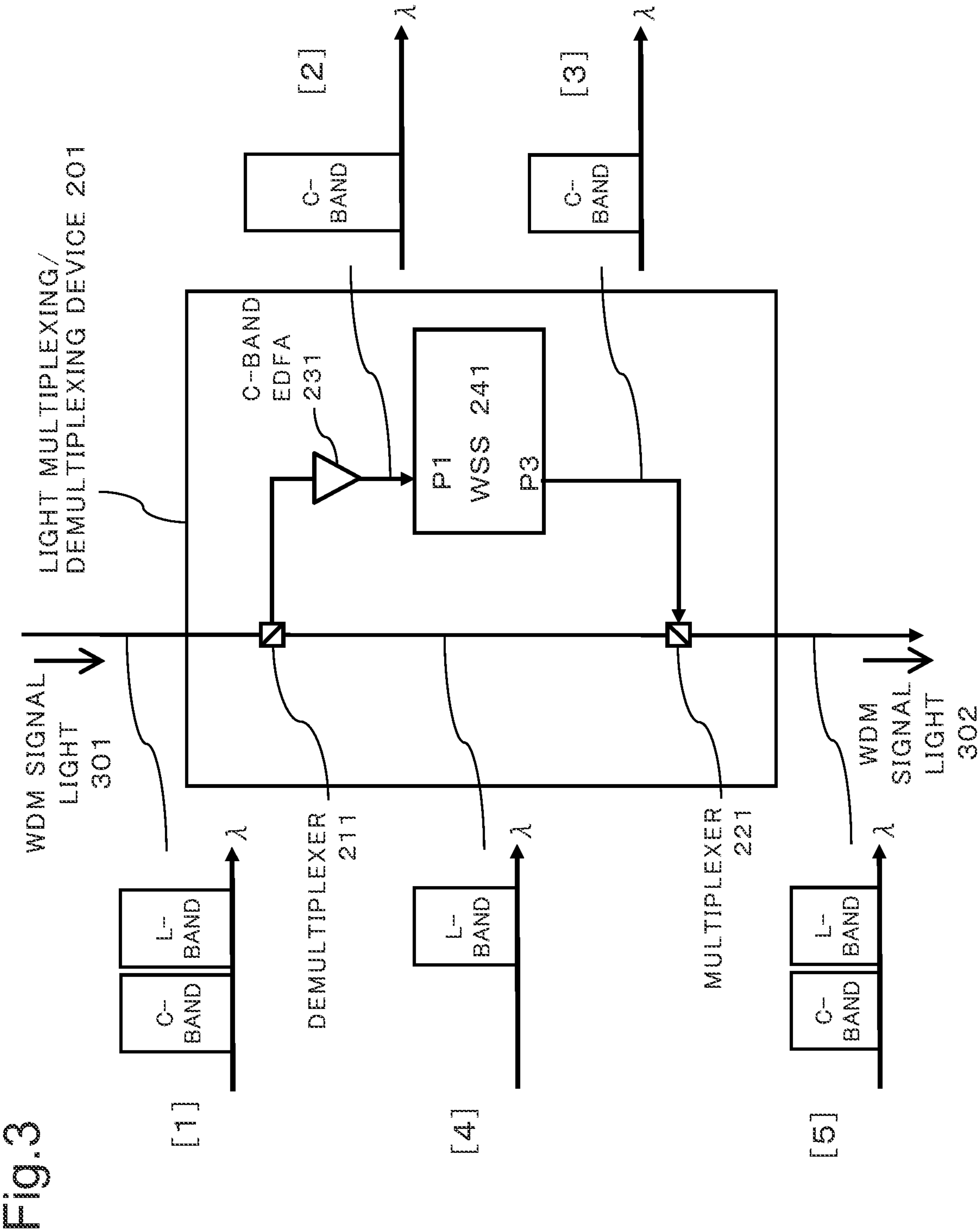
FIG. 3 is a diagram for describing an operation example of a light multiplexing/demultiplexing device 201 according to a first example embodiment.

FIG. 3 is a diagram for describing an operation example of the light multiplexing/demultiplexing device 201 according to the first example embodiment. [1] to [5] in the figure each schematically illustrate a WDM signal light spectrum at each site, where the vertical axis (height) represents optical power and the horizontal axis represents wavelength. The light multiplexing/demultiplexing device 201 receives the WDM signal light 301 ([1]). The demultiplexer 211 demultiplexes the WDM signal light 301 into C-band WDM signal light and L-band WDM signal light. The C-band EDFA 231 amplifies the demultiplexed C-band WDM signal light, and inputs the amplified C-band WDM signal light ([2]) to P1 of the WSS 241.

In FIG. 3, the WSS 241 directly outputs the C-band WDM signal light being input to P1 to the multiplexer 221. In this regard, the optical power of the C-band WDM signal light is attenuated by the WSS 241 ([3]). For this reason, the gain of the C-band EDFA 231 is set to a value capable of compensating for the loss, in the WSS 241, of the C-band WDM signal light being transmitted from the demultiplexer 211 via the WSS 241 to the multiplexer 221. The multiplexer 221 multiplexes the L-band WDM signal light ([4]) being input from the demultiplexer 211 and the C-band WDM signal light ([3]) being input from the WSS 241, and outputs the multiplexed WDM signal light as the WDM signal light 302 ([5]). The WDM signal light 302 is amplified in the optical repeater 113, and transmitted to the terminal station 103

The light multiplexing/demultiplexing device 201 illustrated in FIG. 3 is capable of compensating for the loss of the C-band WDM signal light passing through the WSS 241, by using the C-band EDFA 231. As a result, in the light multiplexing/demultiplexing device 201, even when only the C-band WDM signal light is subjected to loss due to the WSS 241, the occurrence of the optical power difference between the C-band WDM signal light and the L-band WDM signal light included in the WDM signal light 302 may be suppressed. Thus, for example, quality variations for each wavelength band of the signal light included in the WDM signal light 302 may be suppressed. In other words, the gain of the C-band EDFA 231 may be set in such a way as to reduce the difference between the optical power of the L-band WDM signal light being output from the multiplexer 221 and the optical power of the C-band WDM signal light being output from the multiplexer 221. Alternatively, the gain of the C-band EDFA 231 may be set in such a way that the difference between the optical power of the L-band WDM signal light being output from the multiplexer 221 and the optical power of the C-band WDM signal light being output from the multiplexer 221 is equal to or less than a predetermined value. The predetermined value is, for example, a maximum acceptable value of the difference between the optical power of L-band WDM signal light and the optical power of C-band WDM signal light included in the same WDM signal light, the maximum value being acceptable in terms of transmission quality of WDM signal light.

The light multiplexing/demultiplexing device 201 including such a configuration is capable of suppressing the occurrence of the optical power difference between wavelength bands by using a simple structure. The reason therefor is that the EDFA is prepared only for the C-band WDM signal light being subjected to processing by the WSS 241 in the light multiplexing/demultiplexing device 201, and a decrease in the optical power of the C-band WDM signal light through the WSS 241 is compensated.

Another Expression of Light Multiplexing/Demultiplexing Device According to First Example Embodiment The advantageous effect of the light multiplexing/demultiplexing device 201 described with reference to FIG. 2 is also obtained by the following configuration. The numbers in parentheses represent reference signs in relevant FIG. 3. More specifically, a light multiplexing/demultiplexing device (201) includes a first demultiplexing means (211), a first amplifying means (231), a light processing means (241), and a first multiplexing means (221).

The first demultiplexing means (211) demultiplexes input first wavelength-multiplexed signal light (301) into first signal light of a first wavelength band and second signal light of a second wavelength band, and outputs each of the first signal light and the second signal light. The first amplifying means (231) amplifies the second signal light being input from the first demultiplexing means (211). The light processing means (241) outputs fourth signal light, based on the input second signal light and input third signal light of the second wavelength band. The first multiplexing means (221) multiplexes the fourth signal light and the first signal light being output from the first demultiplexing means (211).

Then, the gain of the first amplifying means (231) is set in such a way that the difference between the optical power of the first signal light being output from the first multiplexing means (221) and the optical power of the fourth signal light being output from the first multiplexing means (221) is equal to or less than a predetermined value.

The light multiplexing/demultiplexing device including such a configuration is also capable of suppressing the occurrence of the optical power difference between wavelength bands by using a simple structure.

First Modification Example of Light Multiplexing/Demultiplexing Device 201

Figure 4:
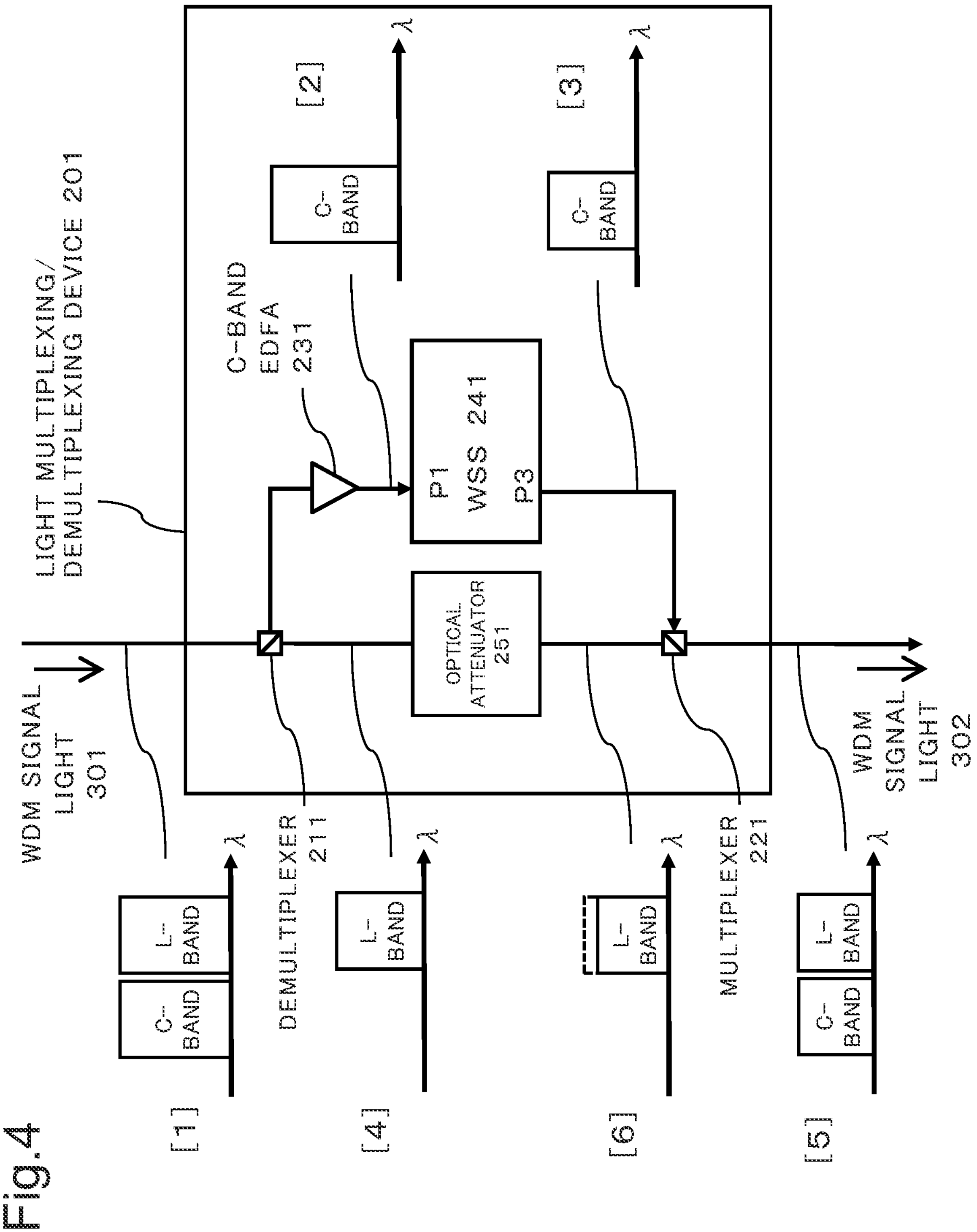
FIG. 4 is a diagram illustrating a first modification example of the light multiplexing/demultiplexing device 201.

FIG. 4 is a diagram illustrating a first modification example of the light multiplexing/demultiplexing device 201. The light multiplexing/demultiplexing device 201 illustrated in FIG. 4 may further include an optical attenuator 251 between the demultiplexer 211 and the multiplexer 221. The optical attenuator 251 is an optical component wherein an attenuation may be controlled by external control, and attenuates the optical power of the L-band WDM signal light ([4]). Only the optical power of L-band WDM signal light ([6]) may be independently adjusted by using the optical attenuator 251. The attenuation of the optical attenuator 251 may be controlled by a control circuit included in the light multiplexing/demultiplexing device 201.

Second Modification Example of Light Multiplexing/Demultiplexing Device 201

Figure 5:
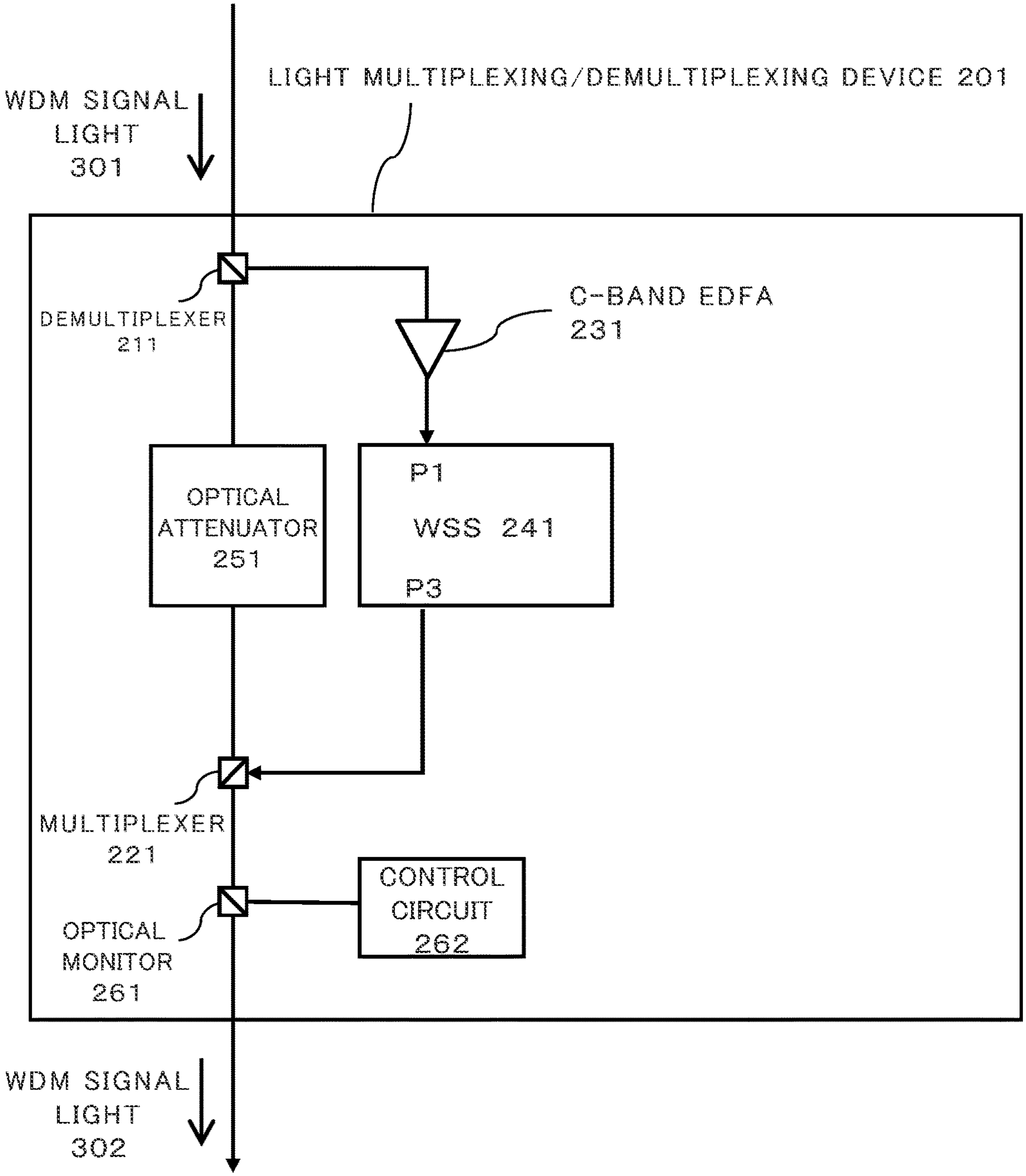
FIG. 5 is a diagram illustrating a second modification example of the light multiplexing/demultiplexing device 201.

FIG. 5 is a diagram illustrating a second modification example of the light multiplexing/demultiplexing device 201. In FIG. 5, an optical monitor 261 is disposed at the output of the multiplexer 221. The optical monitor 261 is a known optical component such as an optical coupler, an optical filter, and a photodiode. The optical monitor 261 outputs, to a control circuit 262, an electric signal of an amplitude relevant to the optical power of the WDM signal light 302 output by the multiplexer 221, for each of predetermined wavelength bands. The predetermined wavelength bands are, for example, a C-band and an L-band, but are not limited to these bands. The control circuit 262 controls, based on the amplitude of an electrical signal being output from the optical monitor 261, the gain of the C-band EDFA 231 in such a way that the optical power of the C-band WDM signal light included in the WDM signal light 302 is the same as the optical power of the L-band WDM signal light included in the WDM signal light 302. When the light multiplexing/demultiplexing device 201 includes the optical attenuator 251, the control circuit 262 may control the gain of the C-band EDFA 231 and the attenuation of the optical attenuator 251, based on the amplitude of the electrical signal being output from the optical monitor 261.

According to the first and second modification examples, the light multiplexing/demultiplexing device 201 is also capable of suppressing the occurrence of the optical power difference between wavelength bands by using a simple structure.

Second Example Embodiment

Figure 6:
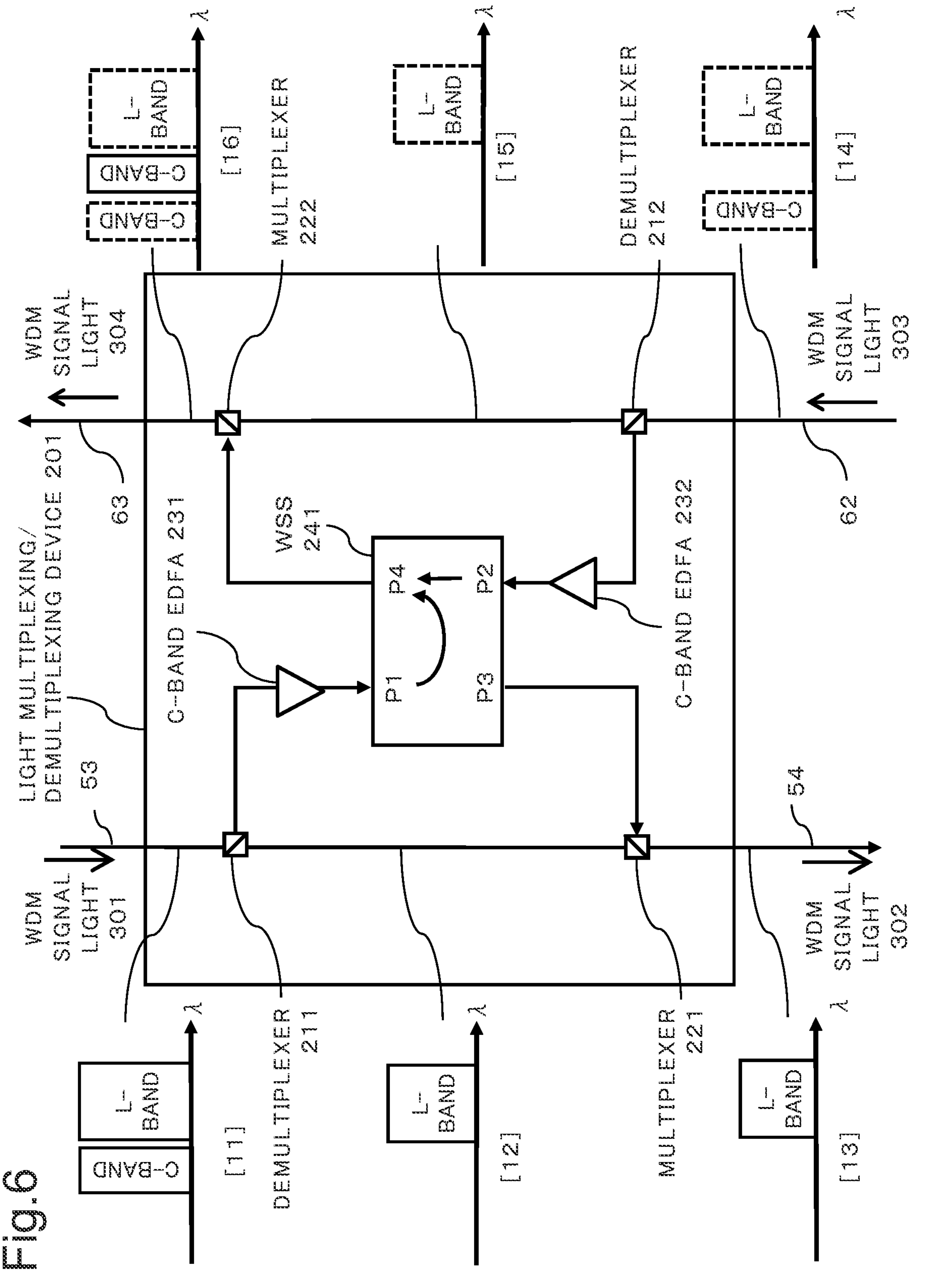
FIG. 6 is a diagram for describing an operation example of a light multiplexing/demultiplexing device 201 according to a second example embodiment.

FIG. 6 is a diagram for describing an operation example of a light multiplexing/demultiplexing device 201 according to a second example embodiment. The configuration of the light multiplexing/demultiplexing device 201 according to the present example embodiment is similar to FIG. 2. In WDM signal light spectra ([11] to [16]) in FIG. 6, WDM signal light spectra included in WDM signal light 301 are indicated using solid lines, and WDM signal light spectra included in WDM signal light 303 are indicated using dashed lines. The light multiplexing/demultiplexing device 201 receives the WDM signal light 301 ([11]) from an optical branching device 121, and receives the WDM signal light 303 ([14]) from an optical repeater 113. A demultiplexer 211 demultiplexes the WDM signal light 301 received from the optical branching device 121 into C-band WDM signal light and L-band WDM signal light. A C-band EDFA 231 amplifies the C-band WDM signal light demultiplexed by the demultiplexer 211. A demultiplexer 212 demultiplexes the WDM signal light 303 received from the optical repeater 113 into C-band WDM signal light and L-band WDM signal light. A C-band EDFA 232 amplifies the C-band WDM signal light demultiplexed by the demultiplexer 212.

A WSS 241 wavelength-multiplexes the C-band WDM signal light being input to P1 from the C-band EDFA 231 and the C-band WDM signal light being input to P2 from the C-band EDFA 232, and outputs the wavelength-multiplexed C-band WDM signal light from P4 to a multiplexer 222. Herein, it is assumed that the wavelengths of carriers of the two types of C-band WDM signal light being wavelength-multiplexed in the WSS 241 do not overlap each other. The multiplexer 222 multiplexes the L-band WDM signal light ([12]) being input from the demultiplexer 212 and the C-band WDM signal light being input from the WSS 241. The multiplexer 222 transmits, to the optical branching device 121, the multiplexed WDM signal light as WDM signal light 304 ([16]). No WDM signal light is output from P3 of the WSS 241. The multiplexer 221 transmits, as WDM signal light 302 ([13]), only the L-band WDM signal light ([12]) included in the WDM signal light 301 to the terminal station 103.

According to the present example embodiment, the C-band WDM signal light included in the WDM signal light 304 includes two types of C-band WDM signal light, i.e., the C-band WDM signal light included in the WDM signal light 301, and the C-band WDM signal light included in the WDM signal light 303. The C-band EDFA 231 amplifies the C-band WDM signal light included in the WDM signal light 301. The C-band EDFA 232 amplifies the C-band WDM signal light included in the WDM signal light 303. Then, each gain of the C-band EDFAs 231 and 232 is set in such a way as to suppress the occurrence of the optical power difference between the C-band WDM signal light and the L-band WDM signal light in the WDM signal light 304 transmitted from the multiplexer 222.

The light multiplexing/demultiplexing device 201 according to the present example embodiment including the above-described configuration is capable of transmitting, to a terminal station 102, the C-band WDM signal light transmitted from a terminal station 101 and the L-band WDM signal light and C-band WDM signal light transmitted from the terminal station 103. Further, since it is not necessary to include an EDFA for L-band WDM signal light, the light multiplexing/demultiplexing device 201 according to the present example embodiment is also capable of suppressing the occurrence of the optical power difference between wavelength bands by using a simple structure.

Third Example Embodiment

Figure 7:
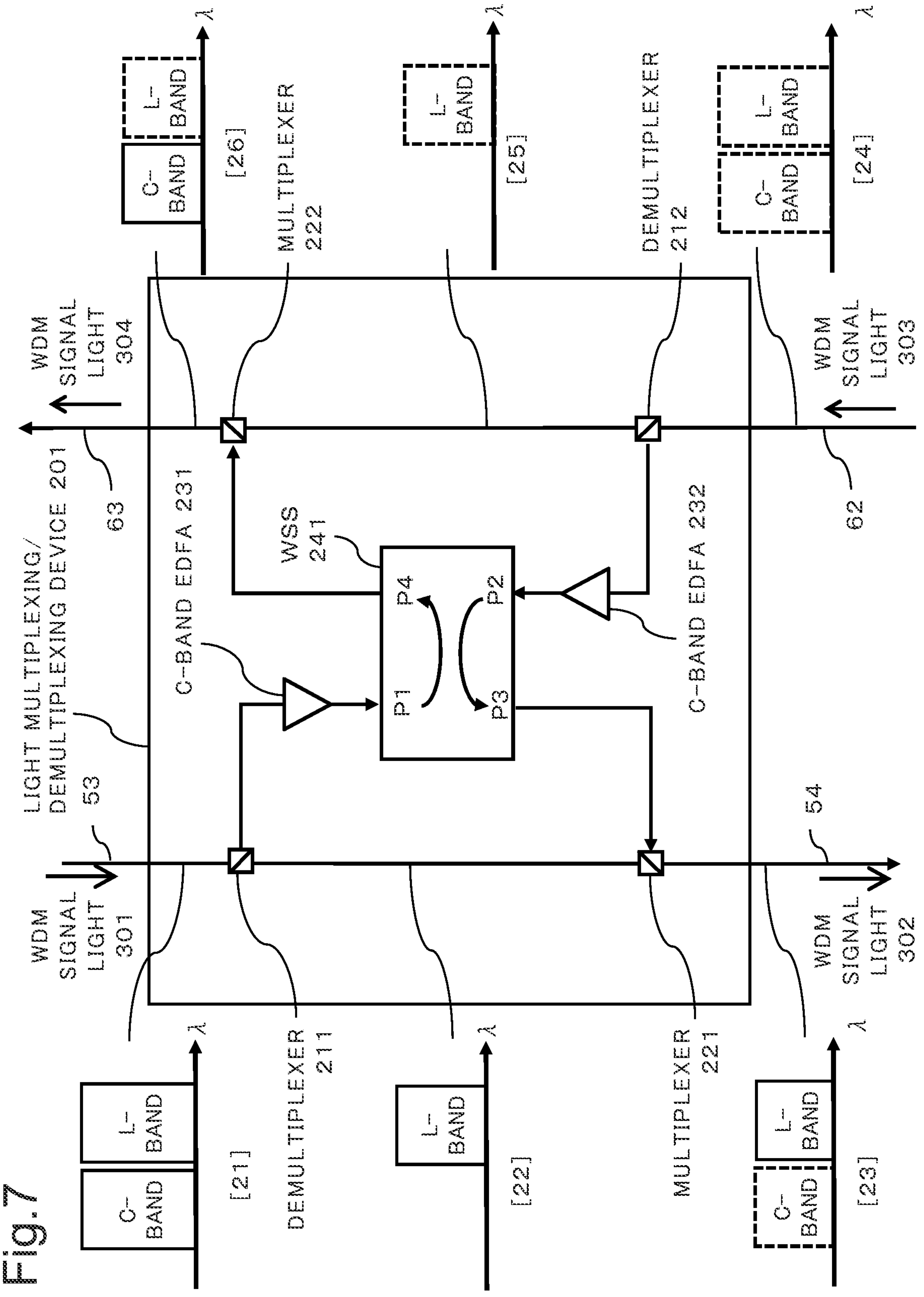
FIG. 7 is a diagram for describing an operation example of a light multiplexing/demultiplexing device 201 according to a third example embodiment.

FIG. 7 is a diagram for describing an operation example of a light multiplexing/demultiplexing device 201 according to a third example embodiment. In WDM signal light spectra ([21] to [26]) in FIG. 7, WDM signal light spectra included in WDM signal light 301 are indicated using solid lines, and WDM signal light spectra included in WDM signal light 303 are indicated using dashed lines.

In FIG. 7, the light multiplexing/demultiplexing device 201 receives the WDM signal light 301 ([21]) from an optical branching device 121, and receives the WDM signal light 303 ([24]) from an optical repeater 113. A demultiplexer 211 demultiplexes the WDM signal light 301 received from the optical branching device 121 into C-band WDM signal light and L-band WDM signal light. A C-band EDFA 231 amplifies the C-band WDM signal light demultiplexed by the demultiplexer 211. A demultiplexer 212 demultiplexes the WDM signal light 303 received from the optical repeater 113 into C-band WDM signal light and L-band WDM signal light. A C-band EDFA 232 amplifies the C-band WDM signal light demultiplexed by the demultiplexer 212.

According to the present example embodiment, a WSS 241 outputs, to a multiplexer 222, the C-band WDM signal light being input from the C-band EDFA 231. Further, the WSS 241 outputs, to a multiplexer 221, the C-band WDM signal light being input from the C-band EDFA 232. The multiplexer 221 multiplexes the L-band WDM signal light ([22]) input from the demultiplexer 211 and the C-band WDM signal light being input from the WSS 241, and transmits WDM signal light 302 ([23]) to the optical repeater 113. The multiplexer 222 multiplexes the L-band WDM signal light ([25]) being input from the demultiplexer 212 and the C-band WDM signal light being input from the WSS 241, and transmits WDM signal light 304 ([26]) to the optical repeater 113.

Herein, the C-band WDM signal light being input to the multiplexer 221 has been included in the WDM signal light 303 transmitted by a terminal station 103. Then, the multiplexer 221 transmits, to the optical repeater 113, the multiplexed WDM signal light as the WDM signal light 302. The optical repeater 113 amplifies the WDM signal light 302 received from the light multiplexing/demultiplexing device 201, and transmits the amplified WDM signal light 302 to the terminal station 103. That is, the light multiplexing/demultiplexing device 201 according to the present example embodiment is capable of looping-back the C-band WDM signal light transmitted from the terminal station 103 to the terminal station 103.

Meanwhile, the multiplexer 222 multiplexes the L-band WDM signal light being input from the demultiplexer 212 and the C-band WDM signal light being input from the WSS 241. Herein, the C-band WDM signal light being input to the demultiplexer 212 has been included in the WDM signal light 301 transmitted by a terminal station 101. Then, the multiplexer 222 transmits the multiplexed WDM signal light as the WDM signal light 304 to the optical branching device 121. The optical branching device 121 transmits the WDM signal light 304 to an optical repeater 112. The optical repeater 112 amplifies the WDM signal light 304 received from the optical branching device 121, and transmits the amplified WDM signal light 304 to a terminal station 102. That is, according to the present example embodiment, the C-band WDM signal light transmitted from the terminal station 101 can be transmitted to the terminal station 102.

According to the present example embodiment, the gain of the C-band EDFA 231 is set in such a way as to suppress the occurrence of the optical power difference between the C-band WDM signal light and the L-band WDM signal light in the WDM signal light 304 transmitted from the multiplexer 222. Further, the gain of the C-band EDFA 232 is set in such a way as to suppress the occurrence of the optical power difference between the C-band WDM signal light and the L-band WDM signal light in the WDM signal light 302 transmitted from the multiplexer 221.

As described above, the light multiplexing/demultiplexing device 201 according to the present example embodiment is capable of suppressing the occurrence of the optical power difference between wavelength bands by using a simple structure. The reason therefor is that an EDFA is prepared only for the C-band WDM signal light being subjected to processing by the WSS 241 in the light multiplexing/demultiplexing device 201, and thereby a decrease in the optical power of the C-band WDM signal light through the WSS 241 is compensated.

In addition, the light multiplexing/demultiplexing device 201 according to the present example embodiment is capable of multiplexing the C-band WDM signal light transmitted from the terminal station 101 with the L-band WDM signal light transmitted from the terminal station 103, and then transmitting the multiplexed WDM signal light to the terminal station 102. Further, the light multiplexing/demultiplexing device 201 according to the present example embodiment is capable of multiplexing the C-band WDM signal light transmitted from the terminal station 103 with the L-band WDM signal light transmitted from the terminal station 101, and then looping-back the multiplexed WDM signal light to the terminal station 103. By including signal light for monitoring/controlling in the C-band WDM signal light to be looped-back, the terminal station 103 may monitor and control an optical transmission path between the terminal station 103 and the light multiplexing/demultiplexing device 201.

Modification Example of Third Example Embodiment

In the light multiplexing/demultiplexing device 201 described with reference to FIG. 7, the WSS 241 may multiplex a part of C-band WDM signal light being input through P1 and a part of C-band WDM signal light being input through P2, the wavelength of which not overlapping with the light being input through P1, and output the multiplexed C-band WDM signal light to the multiplexer 221 or 222. That is, the WSS 241 may be set in such a way that a part of the C-band WDM signal light included in the WDM signal light 301 transmitted from the terminal station 101 is transmitted to the terminal station 103, whereas the other of such light is transmitted to the terminal station 102. In addition, the WSS 241 may be set in such a way that a part of the C-band WDM signal light included in the WDM signal light 303 transmitted from the terminal station 103 is transmitted to the terminal station 102, whereas the other of such light is looped-back to the terminal station 103.

According to the present modification example, the gains of the C-band EDFAs 231 and 232 may be set in such a way as to reduce the optical power difference between the L-band WDM signal light and C-band WDM signal light included in the WDM signal light 302 being transmitted from the multiplexer 221. Alternatively, the gains of the C-band EDFAs 231 and 232 may be set in such a way that the optical power difference between the L-band WDM signal light and C-band WDM signal light included in the WDM signal light 302 being transmitted from the multiplexer 221 is equal to or less than a predetermined value.

Further, the gains of the C-band EDFAs 231 and 232 may be set in such a way as to reduce the optical power difference between the L-band WDM signal light and C-band WDM signal light included in the WDM signal light 304 being transmitted from the multiplexer 222. Alternatively, the gains of the C-band EDFAs 231 and 232 may be set in such a way that the optical power difference between the L-band WDM signal light and C-band WDM signal light included in the WDM signal light 304 being transmitted from the multiplexer 222 is equal to or less than a predetermined value.

Note that the configuration including the optical attenuator according to the first modification example of the first example embodiment and the configuration including the optical monitor and the control circuit according to the second modification example of the first example embodiment may also be applied to the paths of the WDM signal light 303 and 304 in the light multiplexing/demultiplexing devices 201 according to the second and third example embodiments. Thus, the light multiplexing/demultiplexing devices 201 are capable of independently adjusting only the optical power of the L-band WDM signal light included in the WDM signal light 304, and controlling the gains of the C-band EDFAs 231 and 232, based on the optical power for each of the wavelength bands of the WDM signal light 304.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, an example in which the C-band WDM signal light is processed by the WSS 241 while no L-band WDM signal light is processed in the WSS 241 has been described in each of the example embodiments. However, the L-band WDM signal light may be processed by the WSS 241, while no C-band WDM signal light is processed in the WSS 241. In such a case, the demultiplexers 211 and 212, the multiplexers 221 and 222, and the C-band EDFAs 231 and 232 are changed in such a way that the L-band WDM signal light is processed by the WSS 241.

In addition, the wavelength bands included in the WDM signal light being transmitted among the terminal stations 101 to 103 are not limited to the C-band and the L-band. The configuration according to each of the example embodiments is also applicable to a case, in a submarine transmission system in which a WDM signal light including two bands that do not overlap each other is being transmitted among the terminal stations 101 to 103, in which only the WDM signal light in one of the bands is being processed by the WSS 241.

Note that the configurations described in the example embodiments are not necessarily mutually exclusive. The actions and advantageous effects of the present invention may be achieved by a configuration in which all or some of the example embodiments described above are combined.

Above-mentioned functions and procedures described in each of the example embodiments may be achieved by a central processing unit (CPU), which is included in the light multiplexing/demultiplexing device 201, executing a program. The program is recorded in a fixed, non-transitory recording medium. A semiconductor memory or a fixed magnetic disk device is used as the recording medium, but is not limited thereto. The CPU is a computer included in, for example, the control circuit 262, but may be included in another part of the light multiplexing/demultiplexing device 201. Alternatively, the operation of the light multiplexing/demultiplexing device 201 may be controlled by any of the terminal stations 101 to 103.

REFERENCE SIGNS LIST

1 Submarine transmission system
51 to 55, 61 to 65 Submarine cable
101 to 103 Terminal station
111 to 113 Optical repeater
121 Optical branching device
201 Light multiplexing/demultiplexing device
211, 212 Demultiplexer
221, 222 Multiplexer
231, 232 C-band EDFA
241 WSS
251 Optical attenuator
261 Optical monitor
262 Control circuit
301 to 304 WDM signal light
900 Optical amplifier
901 Demultiplexer
902 C-band EDFA
903 L-band EDFA
904 Multiplexer

What is claimed is:

1. A light multiplexing/demultiplexing device comprising:

a first demultiplexer configured to demultiplex input first wavelength-multiplexed signal light into first signal light of a first wavelength band and second signal light of a second wavelength band, and outputting each of the first signal light and the second signal light;

a first amplifier configured to amplify the second signal light being input from the first demultiplexer;

a light processor configured to output fourth signal light, based on the input second signal light and input third signal light of the second wavelength band;

a first multiplexer configured to multiplex the first signal light being output from the first demultiplexer and the fourth signal light;

a second demultiplexer configured to demultiplex input second wavelength-multiplexed signal light into fifth signal light of the first wavelength band and the third signal light;

a second amplifier configured to amplify the third signal light being input from the second demultiplexer; and a second multiplexer configured to multiplex sixth signal light being output from the light processor and the fifth signal light being output from the second demultiplexer, wherein the light processor outputs the sixth signal light, based on the input second signal light and the input third signal light, a gain of the first amplifier is set in such a way that a difference between optical power of the first signal light being output from the first multiplexer and optical power of the fourth signal light being output from the first multiplexer is equal to or less than a predetermined value, and a gain of the second amplifier is set in such a way that a difference between optical power of the fifth signal light being output from the second multiplexer and optical power of the sixth signal light being output from the second multiplexer is equal to or less than the predetermined value.

2. The light multiplexing/demultiplexing device according to claim 1, wherein the first wavelength band is an L-band, and the second wavelength band is a C-band.

3. The light multiplexing/demultiplexing device according to claim 1, wherein the light processor is a wavelength selective switch.

4. The light multiplexing/demultiplexing device according to claim 1, further comprising a first optical attenuator that attenuates optical power of the first signal light being output from the first multiplexer.

5. The light multiplexing/demultiplexing device according to claim 1, further comprising a second optical attenuator that attenuates optical power of the fifth signal light being output from the second demultiplexer.

6. An optical transmission system comprising, in a communicably connected manner:

the light multiplexing/demultiplexing device according to claim 1;

a first terminal station that transmits the first wavelength-multiplexed signal light to the light multiplexing/demultiplexing device;

a second terminal station that receives the fifth signal light and the sixth signal light being output from the second multiplexer; and a third terminal station that receives the first signal light and the fourth signal light being output from the first multiplexer, and outputs the second wavelength-multiplexed signal light to the light multiplexing/demultiplexing device.

7. The optical transmission system according to claim 6, wherein a relay station including an optical amplifier is disposed in at least one of optical transmission paths between the first to third terminal stations and the light multiplexing/demultiplexing device.

8. A light multiplexing/demultiplexing method comprising:

demultiplexing, by a first demultiplexer, input first wavelength-multiplexed signal light into first signal light of a first wavelength band and second signal light of a second wavelength band;

demultiplexing, by a second demultiplexer, input second wavelength-multiplexed signal light into fifth signal light of the first wavelength band and third signal light of the second wavelength band;

amplifying, by a first amplifier, the second signal light;

amplifying, by a second amplifier, the third signal light;

outputting, by a light processor, fourth signal light, based on the amplified second signal light and the amplified third signal light;

outputting, by the light processor, sixth signal light, based on the amplified second signal light and the amplified third signal light;

multiplexing, by a first multiplexer, the fourth signal light and the first signal light being output from the first demultiplexer;

multiplexing, by a second multiplexer, the sixth signal light and the fifth signal light, wherein a gain of amplification of the second signal light is set in such a way that a difference between optical power of the first signal light being output from the first multiplexer and optical power of the fourth signal light being output from the first multiplexer is equal to or less than a predetermined value, and a gain of the second amplifier is set in such a way that a difference between optical power of the fifth signal light and optical power of the sixth signal light is equal to or less than the predetermined value.

9. The light multiplexing/demultiplexing method according to claim 8, further comprising attenuating optical power of the first signal light demultiplexed by the first demultiplexer.

* * * * *